United States Patent [19]

Hoppe et al.

[11] Patent Number: 4,933,004
[45] Date of Patent: Jun. 12, 1990

[54] PREPARATION OF ACICULAR FERROMAGNETIC METAL PARTICLES OF SUBSTANTIALLY IRON

[75] Inventors: Klaus-Dieter Hoppe, Wachenheim; Werner Steck, Ludwigshafen; Jenoe Kovacs, Heissheim; Rainer Feser, Gruenstadt; Helmut Jakusch, Frankenthal, all of Fed. Rep. of Germany

[73] Assignee: BASF Aktiengesellschaft, Ludwigshafen, Fed. Rep. of Germany

[21] Appl. No.: 11,127

[22] Filed: Feb. 5, 1987

[30] Foreign Application Priority Data

Feb. 5, 1986 [DE] Fed. Rep. of Germany ....... 3603431

[51] Int. Cl.[5] .............................................. B22F 9/24
[52] U.S. Cl. ...................................... 75/349; 148/105
[58] Field of Search ..................... 75/0.5 AA, 0.5 BA; 148/105

[56] References Cited

U.S. PATENT DOCUMENTS

| 2,694,656 | 11/1954 | Camras | 428/329 |
|---|---|---|---|
| 2,879,154 | 3/1959 | Campbell | 75/0.5 AA |
| 3,082,067 | 3/1963 | Hund | 423/634 |
| 3,607,220 | 9/1971 | vander Giessen | 75/0.5 AA |
| 3,702,270 | 11/1972 | Kawasaki et al. | 148/105 |
| 3,931,025 | 1/1976 | Woditsch et al. | 252/62.62 |
| 4,050,962 | 9/1977 | Koester et al. | 148/105 |
| 4,122,216 | 10/1978 | Okazoe | 427/128 |
| 4,133,677 | 1/1979 | Matsui et al. | 75/0.5 AA |
| 4,165,232 | 8/1979 | Jaeckh et al. | 75/0.5 AA |
| 4,209,412 | 6/1980 | Marcot | 252/62.62 |
| 4,258,879 | 3/1981 | Nischwitz | 237/51 |
| 4,290,799 | 9/1981 | Schroeder et al. | 75/251 |
| 4,305,753 | 12/1981 | French | 75/0.5 AA |
| 4,309,459 | 1/1982 | Tokuoka | 427/219 |
| 4,344,791 | 8/1982 | Steck et al. | 75/0.5 AA |

FOREIGN PATENT DOCUMENTS

| 0024692 | of 0000 | European Pat. Off. . | |
|---|---|---|---|
| 0024694 | of 0000 | European Pat. Off. . | |
| 0041257 | 12/1981 | European Pat. Off. . | |
| 0056257 | 1/1985 | European Pat. Off. . | |
| 3044772 | of 0000 | Fed. Rep. of Germany . | |
| 1176111 | 7/1962 | Fed. Rep. of Germany . | |
| 1061760 | 3/1963 | Fed. Rep. of Germany . | |
| 1907691 | 9/1971 | Fed. Rep. of Germany . | |
| 2347486 | 1/1976 | Fed. Rep. of Germany . | |
| 2434096 | 9/1977 | Fed. Rep. of Germany . | |
| 2743298 | 8/1979 | Fed. Rep. of Germany . | |
| 2909480 | 9/1981 | Fed. Rep. of Germany . | |
| 143004 | 8/1984 | Japan | 148/105 |
| 2016525 | 9/1979 | United Kingdom . | |

*Primary Examiner*—Melvyn J. Andrews
*Assistant Examiner*—George Wyszomierski
*Attorney, Agent, or Firm*—Keil & Weinkauf

[57] ABSTRACT

Ferromagnetic metal particles of substantially iron are prepared by starting from an acicular $\alpha$-FeOOH, applying a shape-stabilizing finish to the particle surface, heating at 500°–850° C. and subsequently reducing with gaseous reducing agents at 200°–500° C. to the metal, and starting $\alpha$-FeOOH being prepared in the presence of zinc and phosphate ions.

4 Claims, No Drawings

PREPARATION OF ACICULAR FERROMAGNETIC METAL PARTICLES OF SUBSTANTIALLY IRON

The present invention relates to a process for preparing ferromagnetic metal particles of substantially iron starting from an acicular α-FeOOH which, after application of a shape-stabilizing finish to the particle surface, is heated at 500°–850° C. and is subsequently reduced at 200°–500° C. with a gaseous reducing agent to the metal, the starting α-FeOOH having been prepared in the presence of zinc and phosphate ions.

Iron particles of high coercive force for magnetic recording media are obtained, inter alia, by reducing finely divided, acicular iron compounds, for example the oxides or oxide hydroxides, with hydrogen or other gaseous reducing agents. Preference is given to using Fe(III) oxide hydroxides, from which the corresponding iron particles are prepared by heating and reduction and subsequent passivation.

The good magnetic properties and in particular the high coercive force of acicular iron particles are substantially due, despite the cubic crystal lattice, to the shape and isotropy: the needle shape of the particles determines the magnetic properties. To minimize the shape loss in the course of the transformation of the acicular Fe(III) oxide hydroxides and to avoid sintering, the iron oxide hydroxide particles are provided before this transformation with a shape-stabilizing coating. However, it is very important to obtain the correct shape even during the FeOOH synthesis.

FeOOH can be prepared, for example, by the "acid" process. In this process the starting material is an aqueous Fe(II) salt solution, to which may be added further ions. By adding these foreign ions it is possible to affect the shape of the FeOOH particles. At the start of the synthesis some of the Fe(II) is precipitated with an alkali. This is followed by the oxidation, for example by passing in air, to FeOOH. The protons which are freed in the course of the oxidation are initially intercepted by the dissolving Fe(II) hydroxide precipitate, so that the pH does not drop below 5. If all the Fe(II) hydroxide precipitate has been dissolved, the pH drops and the formation of FeOOH virtually ceases. This first part of the FeOOH synthesis is referred to as the nucleation phase. The Fe(II) still in solution is subsequently oxidized with oxidizing agents, for example air, and simultaneously and continuously added alkali, to FeOOH which grows on the existing nuclei. After the synthesis has ended, the FeOOH is provided with a shape-stabilizing coating. This process is known (inter alia U.S. Pat. No. 2,694,656, DE-B-1,061,760) and has been modified in many ways (inter alia GB-A-2,016,526, EP-A-41, 257, DE-B-1,176,111, DE-A-2,347,486, DE-B-2,909,480). Proposals for the shape stabilization following on the synthesis of the α-FeOOH particles include the use of phosphates (U.S. Pat. No. 4,305,753), phosphates and borates (DE-A-2,743,298), alkaline earth metal compounds in conjunction with carboxylic acids (DE-A-2,434,096) or phosphates (U.S. Pat. No. 4,209,412), tin compounds (DE-C-1,907,691) and also compounds of silicon and/or aluminum (EP-A-56,257, DE-A-3,044,772, U.S. Pat. No. 4,133,677). The dehydration and/or heat-treatment of α-FeOOH has likewise been described (inter alia EP-A 24,692, EP-A 24,694, EP-A 56,257, U.S. Pat. No. 3,702,270). The reduction of the resulting iron oxide particles to the metal is customarily effected with gaseous reducing agents, usually hydrogen (U.S. Pat. No. 2,879,154).

The large number of stated and possible parameters in the preparation of acicular ferromagnetic iron particles indicates that existing processes for preparing these particles are unwieldy and expensive, in particular in respect of the high standards required of material suitable for magnetic recording media.

It is an object of the present invention to provide a simple and economical process for preparing acicular ferromagnetic metal particles substantially of iron which have excellent magnetic properties, in particular a high coercive force of more than 105 kA/m, which are very finely divided and which are nonetheless readily incorporable into the binder of the magnetic layer, so that the smooth surface of the layer, which is important in particular for video tapes, is ensured and in respect of this particular use the recording material leads to high signal-to-noise ratios.

We have found that this object is achieved with a process for preparing acicular ferromagnetic metal particles substantially of iron by heating α-FeOOH which has been given a shape-stabilizing finish at 500°–850° C., for 30–300 minutes and subsequently reducing the resulting material to the metal with gaseous reducing agents at 200°–500° C. when the α-FeOOH used is prepared by adding an aqueous alkali to an aqueous iron(II) salt solution which contains zinc ions, in the presence of an oxidizing agent, to precipitate 30 to 70% of iron(II) ions with the formation of α-FeOOH nuclei, then adding phosphate ions to this suspension at a pH of less than 4.0, and subsequently precipitating the remaining iron-(II) ions onto the α-FeOOH nuclei by renewed addition of oxidizing agent and alkali, then adding a nickel and-/or cobalt salt to the aqueous α-FeOOH suspension to coat the α-FeOOH particles with nickel hydroxide and/or cobalt hydroxide, and finally providing on the resulting particles before the reduction to the metal, with a shape-stabilizing finish.

According to the invention, the conventional process of precipitating α-FeOOH is thus modified by adding to the iron(II) salt solution used from 0.1 to 4.0% by weight of zinc ions, based on the stoichiometric amount of FeOOH to be formed. Customarily the iron(II) salt used is iron(II) sulfate and the zinc salt is zinc sulfate. In the particular embodiment of the process according to the invention, phosphate ions are additionally added in this first stage to the reaction solution in an amount of from 0.01 to not more than 3.0% by weight which must be significantly smaller than the amoount of zinc ions, since if the two ions were added in approximately equal amounts the magnetic properties of the end product of the process according to the invention would deteriorate. By adding alkali to the starting solution thus prepared from 30 to 70%, preferably from 40 to 60%, of the iron (II) ions are oxidized to α-FeOOH nuclei with simultaneous oxidation of the divalent iron by means of oxidizing agents, customarily by passing in air. Customary alkalis are used, for example sodium hydroxide solution. This precipitation and oxidation reaction is continued until the pH of the suspension drops to below 4.0. At that point from 0.1 to 4.0, preferably from 1.0 to 2.5, % by weight of phosphate ions, based on the amount of FeOOH end product, are added while the pH is kept below 4.0. By renewed continuous addition of alkali the pH is adjusted to greater than 4.5 and up to 6.0, and the remaining iron(II) ions are precipitated on the α-FeOOH nuclei (growth phase). The pH is then raised to greater than 8.0 and a nickel salt solution is added to the α-FeOOH suspension. Suitable nickel salts are the sulfates and chlorides, the amount ranging from 1.0 to 8.0% by weight of nickel ions, based on the α-FeOOH present.

This specially modified and treated α-FeOOH of the process according to the invention is then provided with a shape-stabilizing finish. Suitable for this purpose is for example the application of an $SiO_2$ deposit on the particle surface in an amount of from 1.0 to 6.0% by weight, based on the amount of α-FeOOH, by applying the $SiO_2$ in the α-FeOOH suspension by adding sodium silicate at a pH of over 8.0. Further shape-stabilizing finishes are known. This application of the finish is followed by the dehydration and then by the heat treatment of the filtered, washed and dried α-FeOOH at 500°–850° C. for 30–300 minutes. The iron oxide particles obtained in the heat treatment are then reduced with gaseous reducing agents, for example with hydrogen, at 200°–500° C. to a metal. Finally, this finely divided metal powder is expediently passivated by controlled oxidation of the surface and thus rendered easy to handle.

The metal particles prepared according to the invention have the required properties and are highly suitable for use as magnetic material for magnetic recording media, such as audio tapes, data recording media and, in particular, video tapes. The recording media are manufactured in a conventional manner. To this end, the metal powder is dispersed together with the customary additives, such as dispersants, eg. sodium oleate, zinc oleate, sodium laurate, sodium palmitate, or sodium stearate, with or without nonmagnetic fillers, such as quartz powder, powders based on silicate, aluminum oxide, zirconium oxide, and binders dissolved in organic solvents, such as elastomeric polyurethanes, epoxy resin, vinyl chloride/vinyl acetate copolymers, OH-containing polyurethanes crosslinked with polyfunctional isocyanates, and mixtures thereof, in a dispersing unit, such as a tubular or stirred ball mill. The magnetic dispersion is then applied by means of a conventional coating machine to the nonmagnetic base. Suitable nonmagnetic bases are the usual base materials, in particular films made of linear polyesters, such as polyethylene terephthalate, and ranging in thickness from 4 to 20 μm. Before the still fluid coating mixture is dried on the base, the anisotropic magnetic particles are oriented in the intended recording direction by the action of a magnetic field. The magnetic layers are then calendered by passing the coated base between heated, polished rolls. The thickness of the magnetic layer is in general from 2 to 6 μm.

The process according to the invention is further illustrated by the following Examples without restricting the claims in any way.

The magnetic properties of the iron powder were measured with a vibrating sample magnetometer in a magnetic field of 160 kA/m after magnetization to saturation in a discharge capacitor. In the case of powder measurements, the coercive force, measured in [kA/m], was based on a tamped density of $\rho = 1.6$ g/cm$^3$. The specific remanence Mr/p is given in [nTm$^3$/g]. The average length of the particles was determined from electron micrographs.

The recording behavior of the magnetic recording media prepared with the magnetic materials prepared according to the invention was determined in the video field on a looped tape drive. The setup comprised fixed video heads and a rotating endless magnetic tape loop with which simultaneous recording and reproduction is possible. The measurements are based on a reference tape.

The quantities measured to characterize the individual tapes where the luminance signal-to-noise ratio (HF-S/N, signal level at 4.5 MHz: noise level at 3.5 MHz, measured at a 30 kHz band width) and the chroma signal-to-noise ratio (CR-S/N, color signal level at 0.75 MHz: noise level at 0.65 MHz, measured at a 30 kHz band width). The quantities are taken from frequency response curves obtained by recording at the optimum HF bias setting of the tape a carrier frequency of 5 MHz which, with a small modulation index, has been phase modulated in such a way that two equal side bands of constant spectral signal density (in total from 0 to 10 MHz) result.

In the tests, the relative tape/head speed was 3.2 m/s; reproduction was effected with a ferrite head, and record with a Sendust head.

EXAMPLE 1

In a 10 l glass vessel equipped with a stirrer, temperature and pH control means and nitrogen and air feed lines, 5.5 l of water were acidified with 3.2 ml of concentrated $H_2SO_4$ while nitrogen was passed through, and 1222 g of chemically pure $FeSO_4.7H_2O$ were dissolved therein. Then 12.8 g of $ZnSO_4.7H_2O$ and 1.1 g of $NaH_2PO_4.2H_2O$ were additionally dissolved in the solution. The reaction mixture was thermostatted to 40° C. A hose pump was then used to pump in 1010 ml of a 15% strength by weight NaOH solution, corresponding to a precipitation ratio of 50% of the Fe(II). The nitrogen feed was switched to air, and the nucleation was carried out at 40° C. until the pH had dropped to below 4.0. 10.0 g of $NaH_2PO_4.2H_2O$ were added to the reaction mixture. Thereafter the growth process was carried out at a pH of 5.5. On completion of the growth phase, a solution of 110 g of $NiSO_4.6H_2O$ in 300 ml of $H_2O$ was pumped in at pH 9, which was followed by stirring for 30 minutes, addition of a solution of 54.5 g of a 26% strength by weight solution of sodium silicate in 200 ml of $H_2O$ and further stirring. The suspension of α-FeOOH was filtered off with suction and washed; the filter cake was dried at 110° C. in a vacuum drying cabinet.

The α-FeOOH obtained was heated in a rotating flask in a stream of nitrogen at 750° C. for 90 minutes and was then reduced at 410° C. in a rotating tube with hydrogen in the course of 8 h to the metal powder, which was finally passivated with a nitrogen/air mixture.

The magnetic material obtained in this way has the following properties:
Surface area: 50.1 m$^2$/g
Coercive force: 109.0 kA/m
Specific remanence: 86.2 nTm$^3$/g

EXAMPLE 2

Example 1 was repeated, except that the amount of $NaH_2PO_4.2H_2O$ added after the nucleation phase was not 10.0 g but 15.0 g.

The magnetic material obtained in this way has the following properties:
Surface area: 46.3 m$^2$/g
Coercive force: 112.0 kA/m
Specific remanence: 84.8 nTm$^3$/g

EXAMPLE 3

Example 1 was repeated, except that 30.0 g of $ZnSO_4.7H_2O$ were added.
The measured results were:
Surface area: 48.2 $m^2/g$
Coercive force: 108.0 kA/m
Specific remanence: 85.6 $nTm^3/g$

EXAMPLE 4

Example 1 was repeated, except that more zinc salt was added, and the 30 g of $ZnSO_4.7H_2O$, and 15 g of $NaH_2PO_4.2H_2O$ were added after the nucleation phase.
The measured results were:
Surface area: 50.2 $m^2/g$
Coercive force: 114.0 kA/m
Specific remanence: 91.5 $nTm^3/g$

EXAMPLE 5

Example 4 was repeated, except that no phosphate was added together with the zinc salt and, after the nucleation phase, 10 g of $NaH_2PO_4.2H_2O$ were added.
The measured results were:
Surface area: 46.6 $m^2/g$
Coercive force: 105.0 kA/m
Specific remanence: 89.3 $nTm^3/g$

EXAMPLE 6

Example 1 was repeated, except that no phosphate was added together with the zinc salt (30 g of $ZnSO_4.7H_2O$) and, after the nucleation phase, 15 g of $NaH_2PO_4.2H_2O$ were added.
The measured results were:
Surface area: 45.9 $m^2/g$
Coercive force: 106.0 kA/m
Specific remanence: 80.5 $nTm^3/g$

EXAMPLE 7

In a 250 l kettle equipped with a stirrer, temperature and pH control means and nitrogen and air feed lines, 108 l of water were acidified with 57 ml of concentrated $H_2SO_4$ while nitrogen was passed in, and 22 kg of chemically pure $FeSO_4.7H_2O$ were dissolved therein. To this solution were added 540 g of $ZnSO_4.7H_2O$ and 20 g of $NaH_2PO_4.2H_2O$, and dissolved. The reaction solution was thermostatted to 45° C. 18 l of a 15% strength by weight NaOH solution were then pumped in, corresponding to a precipitation ratio of 50% of Fe(II). The gas supply was switched to air, and the nucleation was carried out at 45° C. until the pH had dropped below 4.0. 150 g of $NaH_2PO_4.2H_2O$ were added to the reaction mixture. The growth process was then carried out at pH 5.5.

On completion of the growth phase, NaOH was added to bring the pH to 9.5, at which pH a solution of 1075 g of $NiSO_4.6H_2O$ in 3 l of water was added with subsequent stirring for 30 minutes. Finally, a shape-stabilizing finish was applied with a solution of 995 g of colloidal $SiO_2$, 40% strength by weight, in 4 l of water with subsequent stirring for 45 minutes. The α-FeOOH suspension was filtered off on a press filter, washed and dried as a cake at 110° C. in a vacuum drying cabinet.

The α-FeOOH obtained was heated at 700° C. in a tubular furnace for a residence time of 90 minutes and then reduced to the metal with hydrogen at 410° C. in a tubular furnace in the course of a residence time of 7 h. Finally, the metal power was passivated with a nitrogen/air mixture.

The magnetic material obtained in this way had the following properties:
Surface area: 34.4 $m^2/g$
Coercive force: 106.0 kA/m
Specific remanence: 90.0 $nTm^3/g$
Average particle length: 0.08 μm

EXAMPLE 8

Example 7 was repeated, except for the following changes:
(a) addition after nucleation phase: 180 g of $NaH_2PO_4.2H_2O$
(b) addition of 1800 g of $NiSO_4.6H_2O$ at the end of the synthesis
(c) shape-stabilizing finishing with a solution of 1800 g of sodium silicate in 4 l of water
(d) heat treatment at 720° C.
(e) reduction time: 8 h The magnetic material obtained in this way had the following properties:
Surface area: 35.5 $m^2/g$
Coercive force: 109.0 kA/m
Specific remanence: 91.6 $nTm^3/g$
Average particle length: 0.09 μm

EXAMPLE 9

Example 7 was repeated, except for the following changes:
(a) doping: 230 g of $ZnSO_4.7H_2O$ (instead of 540 g)
(b) addition after nucleation phase: 120 g of $NaH_2PO_4.2H_2O$
(c) addition at end of synthesis: 1100 g of $CoSO_4.7H_2O$
(d) shape-stabilizing finishing with a solution of 880 ml of colloidal $SiO_2$ in 4 l of water
(e) heat treatment at 720° C.
(f) reduction time: 8 h The resulting material gave the following measurements:
Surface area: 45.4 $m^2/g$
Coercive force: 108.0 kA/m
Specific remanence: 92.7 $nTm^3/g$
Average particle length: 0.1 μm

EXAMPLE 10

700 parts of an acicular iron powder from Examples 7 to 9 were dispersed together with 91 parts of a spherical $Al_2O_3$ powder having an average particle diameter of 0.6 μm in 722.8 parts of a 13% strength solution of a thermoplastic polyester urethane, obtained from adipic acid, butan-1,4-diol and 4,4'-diisocyanatodiphenylmethane, in a mixture of equal parts of tetrahydrofuran and dioxane, 201.3 parts of a 20% strength solution of a phenoxy resin of bisphenol A and epichlorohydrin having an average molecular weight of 30,000 and a hydroxyl content of 6% in the abovementioned solvent mixture, and a further 264.1 parts of this solvent mixture in a ball mill which had a capacity of 6,000 parts by volume and contained 2,330 parts of balls from 1 to 1.5 mm in diameter in the presence of 3.5 parts of stearic acid and 55.4 parts of a dispersant based on a mixture of an ethoxylated monophosphoric acid ester and the salt of an ethylhexyl sulfosuccinate, for 32 hours. 23.7 parts of methyl stearate were then added, and dispersion was carried out for a further 5 hours. On completion of the dispersion, 46.7 parts of a 50% strength solution of a triisocyanate, prepared from 3 moles of toluylene diisocyanate and 1 mole of 1,1,1-trimethylolpropane, in ethyl acetate with 15 minutes of subsequent stirring. The dispersion was filtered and applied in the form of a coating to a polyethylene terephthalate film with simultaneous alignment of the magnetic particles by means of a permanent magnet. After drying, the magnetic layer was calendered by passing the coated film between heated rolls at 90° L C. under a nip pressure of 200 kg/cm, and the coated film web was slit into ½ inch wide tapes.

The measurement of the magnetic properties was carried out in a magnetic field of 800 kA/m. The video properties were determined against the $CrO_2$ reference tape, GVL 868, on a looped tape drive. The measured results are given in Table 1.

TABLE 1

| Example | Luminance | | | Modulation | Chroma | | |
|---|---|---|---|---|---|---|---|
| | Signal [dB] | Noise [dB] | S/N [dB] | Noise [dB] | Signal [dB] | Noise [dB] | S/N [dB] |
| 7 | +12.0 | +3.5 | +8.5 | −8.0 | +5.5 | ±0 | +5.5 |
| 8 | +12.0 | +3.5 | +8.5 | −6.5 | +7.5 | +1.0 | +6.5 |
| 9 | +12.7 | +4.2 | +8.5 | −8.6 | +7.5 | +1.5 | +6.0 |

COMPARATIVE EXPERIMENT 1

Example 1 was repeated, except for the following changes: (a) doping: 30 g of $ZnSO_4.7H_2O$, no phosphate and (b) no phosphate added after the nucleation phase. The measured results were:
Surface area: 41.8 m²/g
Coercive force: 95.3 kA/m
Specific remanence: 87.0 nTm³/g

COMPARATIVE EXPERIMENT 2

Example 1 was repeated, except for the following changes: a) doping: 5.1 g of $NaH_2PO_4.2H_2O$ no zinc sulfate and b) no phosphate added after the nucleation phase. The measured results were:
Surface area: 43.9 m²/g
Coercive force: 94.8 kA/m
Specific remanence: 91.3 nTm³/g

COMPARATIVE EXPERIMENT 3

Example 1 was repeated, except for the absence of any doping whatsoever. The measured results were:
Surface area: 33.6 m²/g
Coercive force: 90.1 kA/m
Specific remanence: 81.7 nTm³/g

COMPARATIVE EXPERIMENT 4

Example 1 was repeated, except for a doping with 10.0 g of $NaH_2PO_4.2H_2O$ (in addition to 12.8 g of $ZnSO_4.7H_2O$) and no addition of phosphate after the nucleation phase. The measured results were:
Surface area: 47.2 m²/g
Coercive force: 91.7 kA/m
Specific remanence: 81.4 nTm³/g

COMPARATIVE EXPERIMENT 5

Example 1 was repeated, except that DE-B-117,611 was followed by doping with 10.0 g of phosphate and 30 g of $ZnSO_4.7H_2O$ and adding no phosphate after the nucleation phase. The measured results were:
Surface area: 51.5 m²/g
Coercive force: 87.4 kA/m
Specific remanence: 89.5 nTm³/g

We claim:

1. An improved process for preparing acicular ferromagnetic metal particles substantially of iron by nucleating and growing α-FeOOH particles in the presence of zinc and phosphate ions, coating the α-FeOOH particles formed with nickel hydroxide, cobalt hydroxide or mixture thereof, providing a shape-stabilizing finish on the resulting particles and reducing the resulting material to the metal with gaseous reducing agents at 200°–500° C., wherein the improvement comprises:
    precipitating iron(II) ions to form α-FeOOH nuclei by adding an aqueous alkali to an aqueous iron(II) salt solution containing zinc ions, in the presence of an oxidizing agent, to precipitate 30 to 70% of the iron(II) ions, and then adding phosphate ions at a pH of less than 4 and precipitating the remaining iron(II) ions onto the α-FeOOH nuclei by renewed addition of oxidizing agent and alkali.

2. The process of claim 1 wherein the formation of the α-FeOOH nuclei from the aqueous iron(II) salt solution is carried out in the presence of from 0.1 to 4.0% by weight of zinc ions, based on the amount of stoichiometrically resulting FeOOH.

3. An improved process for preparing acicular ferromagnetic metal particles substantially of iron by nucleating and growing α-FeOOH particles in the presence of zinc and phosphate ions, coating the α-FeOOH particles formed with nickel hydroxide, cobalt hydroxide or mixture thereof, providing a shape-stabilizing finish on the resulting particles and reducing the resulting material to the metal with gaseous reducing agents at 200°–500° C., wherein the improvement comprises:
    precipitating iron(II) ions to form α-FeOOH nuclei by adding an aqueous alkali to an aqueous iron(II) salt solution containing zinc and phosphate ions, in the presence of an oxidizing agent, to precipitate 30 to 70% of the iron(II) ions, said phosphate ions being present in a lesser amount compared to the amount of zinc ions present, and then adding phosphate ions at a pH of less than 4 and precipitating the remaining iron(II) ions onto the α-FeOOH nuclei by renewed addition of oxidizing agent and alkali.

4. The process of claim 3 wherein the aqueous iron(II) salt solution used in the formation of α-FeOOH nuclei contains from 0.01 to 3.0% by weight of phosphate ions, the ratio of zinc to phosphate ions in percent by weight being greater than 5.

* * * * *